United States Patent
Lee et al.

(10) Patent No.: US 12,047,250 B2
(45) Date of Patent: Jul. 23, 2024

(54) GRAPH EMBEDDING-BASED VIRTUAL NETWORK MAPPING METHOD

(71) Applicant: Research & Business Foundation Sungkyunkwan University, Suwon-si (KR)

(72) Inventors: Young Seok Lee, Suwon-si (KR); Min Jae Park, Suwon-si (KR); Ik Jun Yeom, Suwon-si (KR); Hong Uk Woo, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 18/071,046

(22) Filed: Nov. 29, 2022

(65) Prior Publication Data

US 2023/0231774 A1    Jul. 20, 2023

(30) Foreign Application Priority Data

Nov. 29, 2021 (KR) .......... 10-2021-0167071

(51) Int. Cl.
*H04L 41/14* (2022.01)
*H04L 12/46* (2006.01)

(52) U.S. Cl.
CPC ........ *H04L 41/145* (2013.01); *H04L 12/4641* (2013.01)

(58) Field of Classification Search
CPC ............... H04L 12/4641; H04L 41/145
(Continued)

(56) References Cited

U.S. PATENT DOCUMENTS 10,841,183 B1 * 11/2020 Shahriar ............. H04J 14/0257
2017/0033976 A1 * 2/2017 Ahmed .................. H04L 41/12
(Continued)

FOREIGN PATENT DOCUMENTS

CN         112911626 A  *  6/2021  ............... G06N 3/08
WO    WO-2021204365 A1  * 10/2021  ......... H04L 41/0609

OTHER PUBLICATIONS

Park et al., Gemma: Reinforcement Learning-Based Graph Embedding and Mapping for Virtual Network Applications, IEEEACCESS, pp. 1-14 (Jul. 26, 2021) (Year: 2021).*
(Continued)

*Primary Examiner* — David P Zarka
(74) *Attorney, Agent, or Firm* — NSIP Law

(57) ABSTRACT

The present invention provides a graph embedding-based virtual network mapping method including inputting a virtual network and a substrate network corresponding to a virtual network mapping scenario, in an optimized mapping mode, generating an embedding value for every substrate node by applying a graph convolution network (GCN), by a network encoder, to embed the virtual network, determining whether a difference between an embedding value for every substrate node and an embedding value for every previous substrate node which is previously embedded exceeds a set threshold, by a network decoder, and mapping an allocation node of the virtual network to a mapping node of a previous substrate network which is previously mapped according to an embedding value for every previous substrate node when the difference value does not exceed the threshold value, by the network decoder.

7 Claims, 7 Drawing Sheets

(58) Field of Classification Search
USPC .......................................................... 709/223
See application file for complete search history.

(56) References Cited

U.S. PATENT DOCUMENTS

2017/0278288 A1* 9/2017 Suzuki ...................... G06T 7/74
2021/0111959 A1* 4/2021 Shahriar ................. H04L 41/40
2022/0101327 A1* 3/2022 Arora ....................... G06N 3/08

OTHER PUBLICATIONS

Yan et al., Automatic virtual network embedding: A deep reinforcement learning approach with graph convolutional networks, IEEE J. Sel. Areas Commun., vol. 38, No. 6, pp. 1040-1057 (Jun. 2020) (Year: 2020).*

Kipf et al., Semi-Supervised Classification with Graph Convolutional Networks, Proc. Int. Conf. Learn. Represent., pp. 1-13 (2017) (Year: 2017).*

Xie et al., Virtualized Network Function Forwarding Graph Placing in SDN and NFV-Enabled IoT Networks: A Graph Neural Network Assisted Deep Reinforcement Learning Method, IEEE Transactions On Network and Service Management, vol. 19, No. 1, pp. 524-537 (Mar. 2022) (Year: 2022).*

Chowdhury et al., ViNEYard: Virtual Network Embedding Algorithms With Coordinated Node and Link Mapping, IEEE/ACM Transactions On Networking, vol. 20, No. 1, pp. 206-219 (Feb. 2012) (Year: 2012).*

* cited by examiner

GRAPH EMBEDDING-BASED VIRTUAL NETWORK MAPPING METHOD

CROSS-REFERENCE TO RELATED APPLICATIONS

This application claims the priority of Korean Patent Application No. 10-2021-0167071 filed on Nov. 29, 2021, in the Korean Intellectual Property Office, the disclosure of which is incorporated herein by reference.

TECHNICAL FIELD

The present invention relates to a graph embedding-based virtual network mapping method, and more specifically, to a graph embedding-based virtual network mapping method which easily maps a virtual network to a substrate network by graph embedding regardless of an operation environment, such as a network size and a VNM scenario.

BACKGROUND ART OF INVENTION

Network virtualization is a network technology which accommodates various types of user groups without causing mutual interference using a single physical network resource.

At this time, in the network virtualization, virtual network mapping (VNM) is a function of allocating a virtual network formed by disposing nodes having a physical network resource to a substrate network which is a physical network, for example, data center nodes and internet service provider nodes.

A virtual network is mapped or allocated to the substrate network through the VNM to operate over a substrate network, and this problem is handled in a data center network, an internet service provider, cloud computing, and IoT.

At this time, the virtual network mapping is performed by embedding the substrate network and the virtual network expressed as an image form using the CNN, or embeds the substrate network and the virtual network using a general multi-layer perceptron (MLP).

Here, there are problems in that the above-described virtual network mapping is focused on embedding, and a structure of the reinforcement learning needs to be changed in an environment with a dynamic network size.

Recently, a method for embedding the virtual network and the substrate network regardless of the operation environment is being studied.

DISCLOSURE OF INVENTION

Technical Problem to be Solved

An object of the present invention is to provide a graph embedding-based virtual network mapping method which easily maps a virtual network to a substrate network by graph embedding, regardless of an operation environment, such as a network size and a VNM scenario.

The objects of the present invention are not limited to the above-mentioned objects, and other objects and advantages of the present invention which have not been mentioned above can be understood by the following description and become more apparent from exemplary embodiments of the present invention. Further, it may be understood that the objects and advantages of the present invention may be embodied by the means and a combination thereof in the claims.

According to an aspect of the present invention, a graph embedding-based virtual network mapping method may include: inputting a virtual network and a substrate network corresponding to a virtual network mapping scenario; in an optimized mapping mode, generating an embedding value for every substrate node by applying a graph convolution network (GCN), by a network encoder, to embed the virtual network; determining whether a difference value between an embedding value for every substrate node and an embedding value for every previous substrate node which is previously embedded exceeds a set threshold, by a network decoder; and mapping an allocation node of the virtual network to a mapping node of a previous substrate network which is previously mapped according to an embedding value for every previous substrate node when the difference value does not exceed the threshold value, by the network decoder.

Technical Solution to Solve Problems

The method may further include controlling the network encoder to generate an embedding value for every node by embedding the substrate network by the network decoder when the difference exceeds the threshold.

In the mapping, an allocation node of the virtual network and a mapping node of the substrate network may be mapped to each other based on the embedding value for every substrate node and the embedding value for every node.

In the mapping, the allocation node having a highest embedding value is selected among the embedding values for every substrate node, and the allocation node and the mapping node may be mapped.

The method may further include: generating an embedding value for every node by embedding the embedding value for every substrate node and the substrate network by the network encoder, in a normal mapping mode; and mapping an allocation node of the virtual network and a mapping node of the substrate network based on the embedding value for every substrate node and the embedding value for every node, by the network decoder.

The method further may further include determining whether a current mode is an optimized mapping mode before the generating of the embedding value.

In the generating of an embedding value, the embedding value for every substrate node and the embedding value for every node may be generated by applying a distance between nodes of the virtual network and a distance between nodes of the substrate network to the MLP function.

Advantageous Effects of Invention

A graph embedding-based virtual network mapping method according to the present invention has an advantage in that virtual network mapping which is not applied to a network size may be performed by embedding calculation and mapping per node.

A graph embedding-based virtual network mapping method according to the present invention has an advantage in that when the mapping per node is performed, the scenario for the virtual network mapping may be optimized by checking an allocable capacity of the network, and determining embedding recalculation for the substrate network.

The effects of the present invention are not limited to the aforementioned effects, and various other effects may be included within a range which is obvious to those skilled in the art from the following description.

DETAILED DESCRIPTION FOR IMPLEMENTING INVENTION

Figure 1:
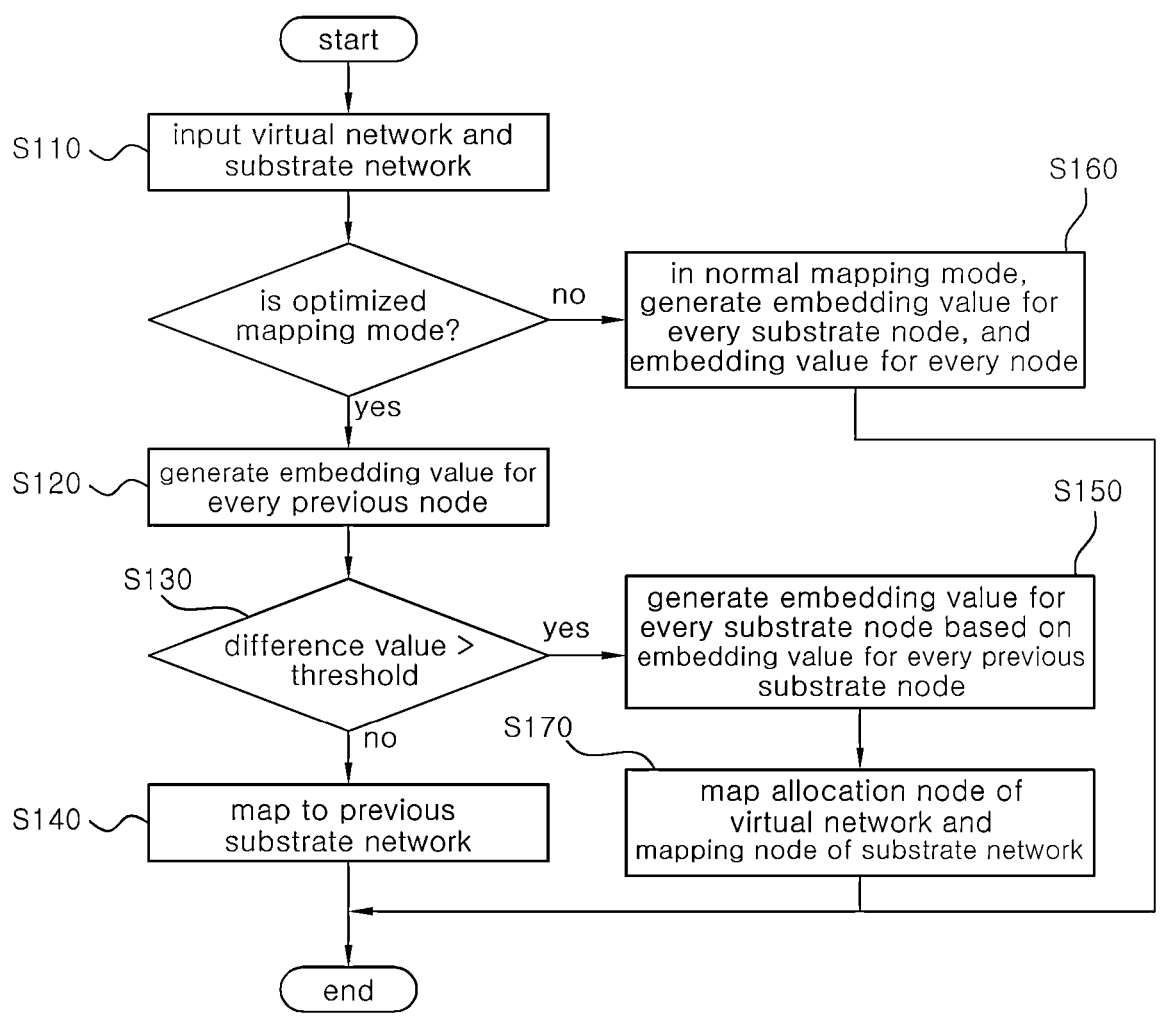
FIG. 1 is a flowchart illustrating a graph embedding-based virtual network mapping method according to the present invention.

Those skilled in the art may make various modifications to the present invention and the present invention may have various embodiments thereof, and thus specific embodiments will be described in detail with reference to the drawings. However, this does not limit the present invention within specific exemplary embodiments, and it should be understood that the present invention covers all the modifications, equivalents and replacements within the spirit and technical scope of the present invention. In the description of respective drawings, similar reference numerals designate similar elements.

Terms such as first, second, A, or B may be used to describe various components but the components are not limited by the above terms. The above terms are used only to distinguish one component from the other component. For example, without departing from the scope of the present invention, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

Terms used in the present application are used only to describe a specific exemplary embodiment, but are not intended to limit the present invention. A singular form may include a plural form if there is no clearly opposite meaning in the context. In the present application, it should be understood that the term "include" or "have" indicates that a feature, a number, a step, an operation, a component, a part or the combination thereof described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

Throughout the specification and claims, when a part includes a certain component, this means that it may further include other components, not excluding other components unless otherwise stated.

Hereinafter, preferred embodiments according to the present invention will be described in detail with reference to the accompanying drawings.

Figure 2:
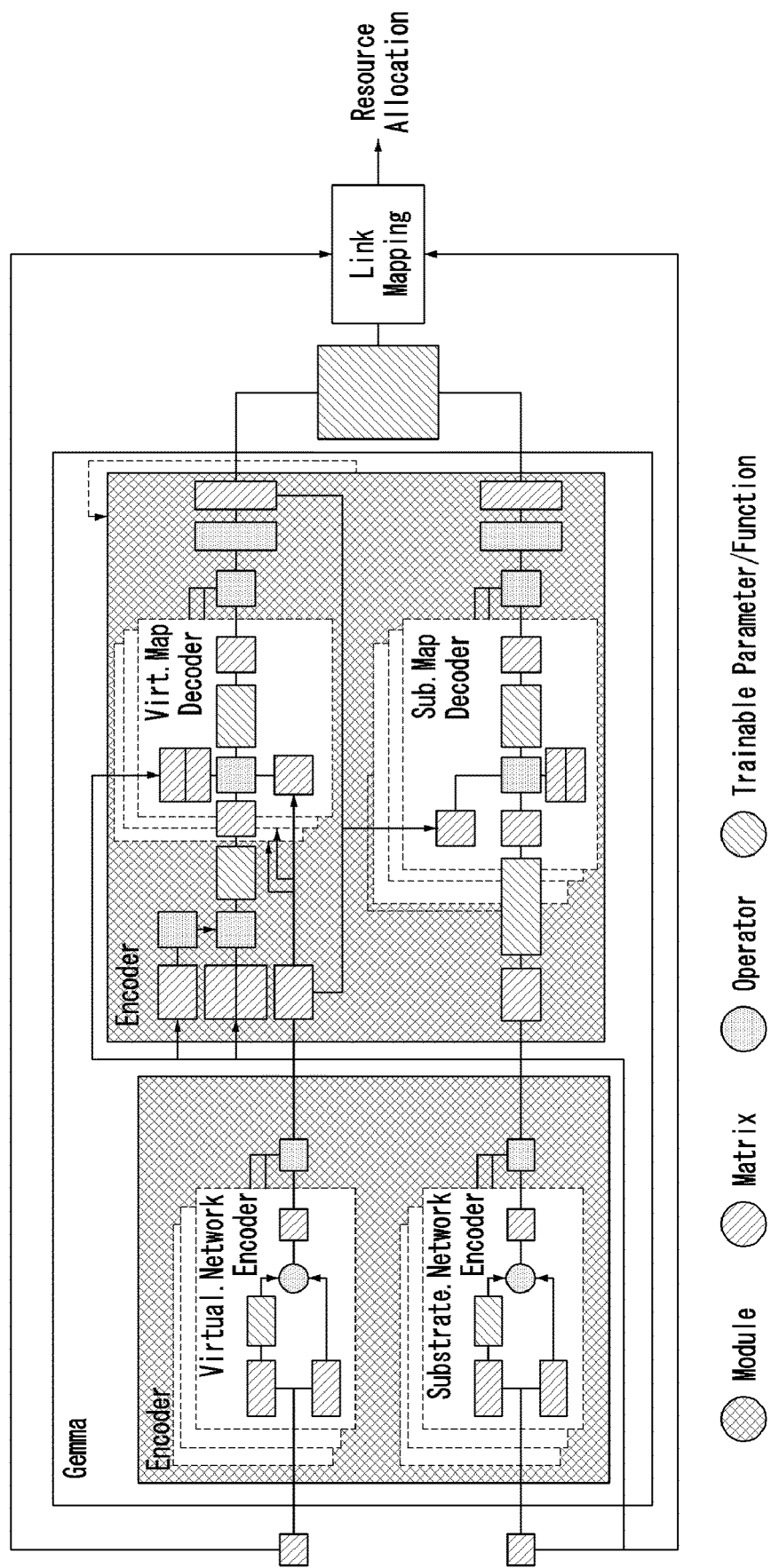
FIG. 2 is an exemplary view illustrating a graph embedding-based virtual network mapping structure according to the present invention.
Figure 3A:
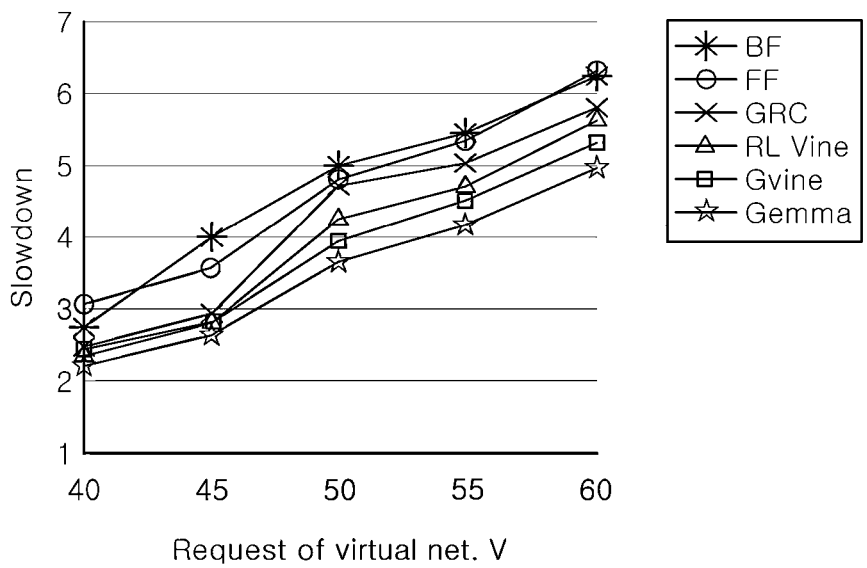
FIGS. 3A to 3D are exemplary views of a performance to which a graph embedding-based virtual network mapping method according to the present invention is applied.
Figure 3B:
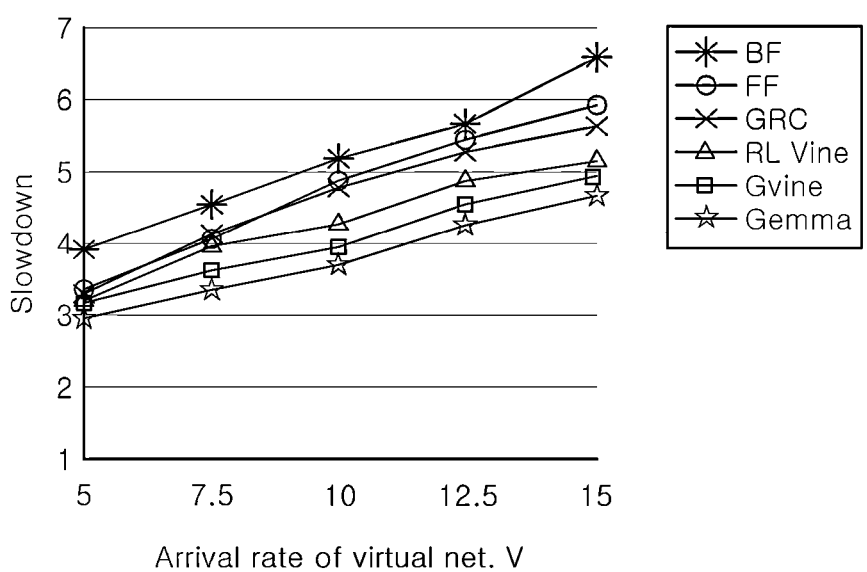
Figure 3C:
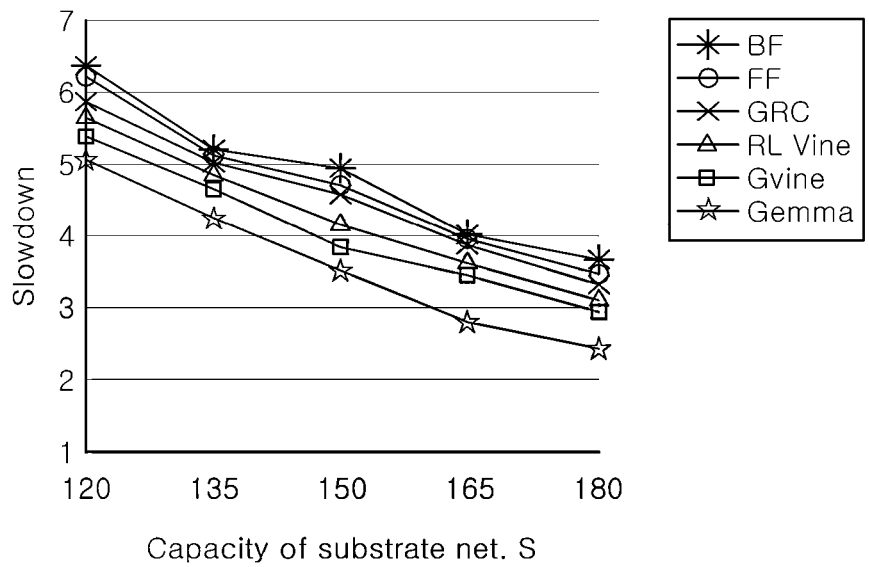
Figure 3D:
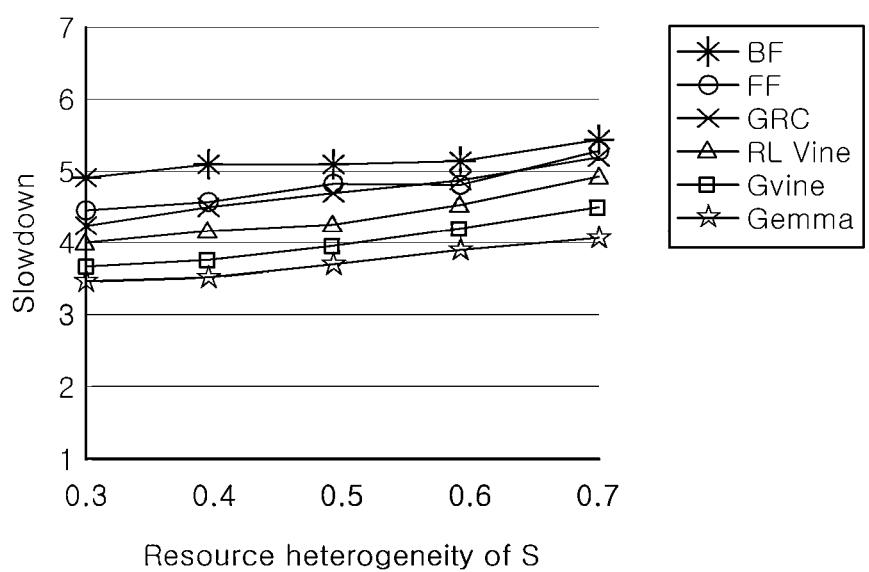
Figure 4A:
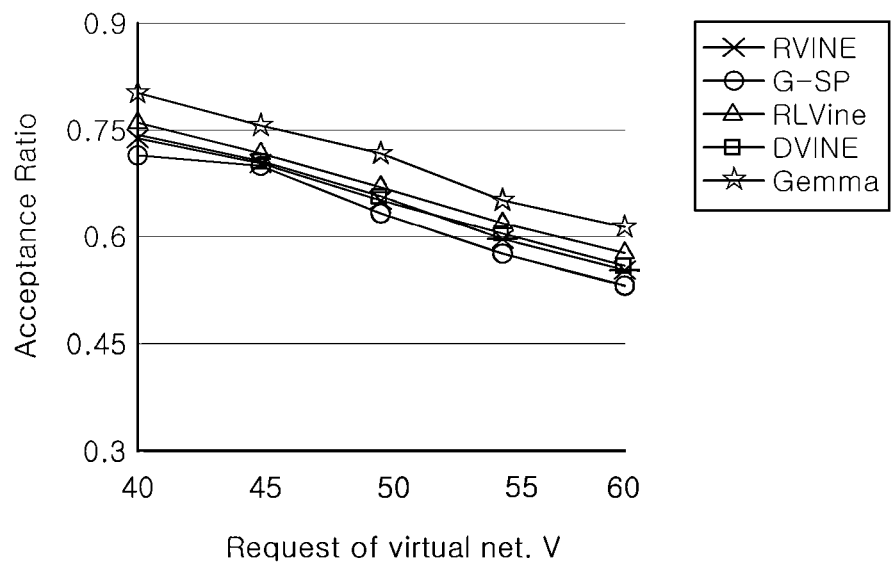
FIGS. 4A to 4D are exemplary views of a performance to which a graph embedding-based virtual network mapping method according to the present invention is applied.
Figure 4B:
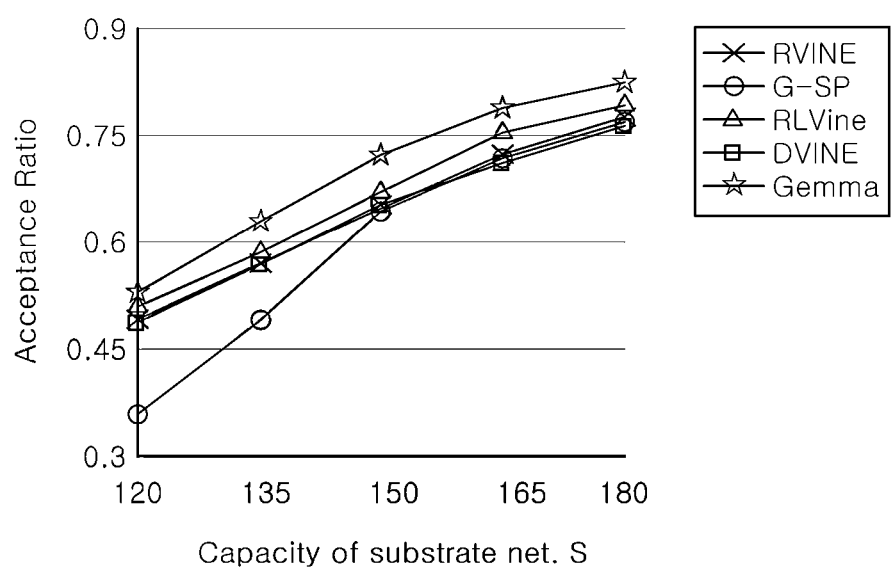
Figure 4C:
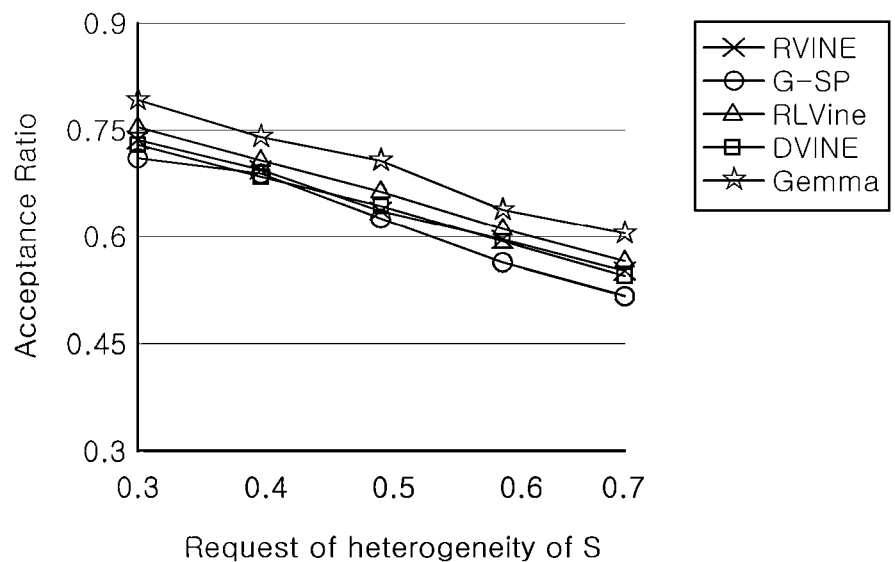
Figure 4D:
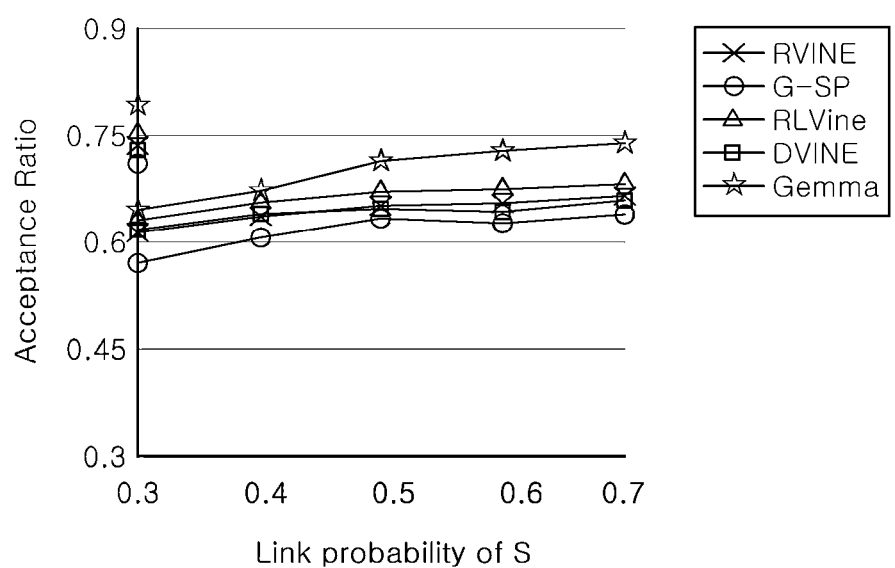

FIG. 1 is a flowchart illustrating a graph embedding-based virtual network mapping method according to the present invention and FIG. 2 is an exemplary view illustrating a graph embedding-based virtual network mapping structure according to the present invention.

Referring to FIGS. 1 and 2, a virtual network mapping method may input a virtual network and a substrate network corresponding to a virtual network mapping scenario in step S110.

In an optimized mapping mode, a network encoder may apply a graph convolution network (GCN) to embed the virtual network to generate an embedding value for every substrate node in step S120.

A network decoder may determine whether a difference value between an embedding value for every substrate node and an embedding value for every previous substrate node which is previously embedded exceeds a set threshold in step S130.

When the difference value does not exceed the threshold value, the network decoder may map an allocation node of the virtual network to a mapping node of a previous substrate network which is previously mapped according to an embedding value for every previous substrate node in step S140.

In step S130, when the difference value exceeds the threshold value, the network decoder may control the network encoder to allow the network encoder to embed the substrate network to generate an embedding value for every node in step S150.

After the step S110, in a normal mapping mode, the network encoder may embed the embedding value for every substrate node and the substrate network to generate an embedding value for every node in step S160.

The network decoder may map an allocation node of the virtual network and a mapping node of the substrate network based on the embedding value for every substrate node and the embedding value for every node in step S170.

According to the present invention, with a reinforcement learning based encoder-decoder structure, the network encoder performs embedding of the virtual network and the substrate network by iterative calculation per node, and the network decoder may establish a policy of virtual network mapping by iterative mapping per node using the embedding value.

In the policy process, both a normal mapping mode and an optimized mapping mode are supported.

In the normal mapping mode, a virtual network allocation node and a substrate network mapping node are determined at one time, and in the optimized mapping mode, the virtual network allocation node is determined and then a mapping node of the substrate network may be determined thereafter.

In the optimized mapping mode, a capacity of the substrate network is recalculated in real-time according to a discriminator to optimize by setting the trade-off relationship between accuracy and speed.

As illustrated in FIG. 2, the network encoder may commonly operate in both the normal mapping mode and the optimized mapping mode.

Each node is denoted by v with respect to the virtual network V, and each node may be expressed by s with respect to the substrate network S.

Here, the vector expressions are expressed by $x^{(v)}$ and $x^{(s)}$ respectively, and the matrix expressions are expressed by $X^{(V)}$ and $X^{(S)}$. Further, $\mathcal{O}^{(V)}$ expresses a node set of the virtual network, and $\mathcal{O}^{(S)}$ expresses a node set of the substrate network.

In the embedding step, embedding E: $[e_1, e_2, \ldots, e_n]$ for each network is obtained by the following graph embedding equation.

$$E = \sum_{i=1}^{T} MLP(X) \times L^i$$

Here, L is a Laplacian matrix and represents an adjacent matrix value between nodes, and T is a distance between nodes to be considered for embedding. That is, if T is 3, graph embedding NetEmbed(•) is performed in consideration of characteristics of three adjacent nodes during the embedding.

$E^{(V)}$ is a virtual network embedding value, and $E^{(S)}$ is a substrate network embedding value. These embedding values are time-variant.

First, in the normal mapping mode, the network decoder may operate as follows.

$$E^{(V)}:[e_1^{(v)}, \ldots, e_n^{(v)}], E^{(S)}:[e_1^{(s)}, \ldots, e_m^{(s)}]$$

Each embedding value is formed of an embedding vector of nodes. Scores are obtained as follows by paring nodes for the virtual network and the substrate networks using a trainable MLP function.

$$q^{(v,s)} = MLP([e^{(v)}:e^{(s)}])$$

At this time, it is assumed that resources of the substrate network are allocated whenever nodes of the substrate network and the virtual network are paired, so that the pairing is performed only when a resource which is required by a virtual network remains in the substrate network. That is, the pairing may be performed when the following condition is satisfied.

$$Alocable(v, s) = \bigwedge_{c \in C} x_c^{(s)} \geq x_c^{(v)}$$

Here, C refers to a set of sources, such as CPU or RAM, and $x^{(v)}_c$ and $x^{(s)}_c$ refer to resources of nodes of the virtual network and the substrate network.

After obtaining scores for all possible combinations, rankings are assigned in an ascending order using the Softmax function and VPN mapping is performed on the pair having the highest score.

$$Pr[(v, s)] = \frac{\exp(q^{(v,s)})}{\sum_{v' \in O_k^{(V)}, v \in S} \exp(q^{(v,s)})}$$

Here, $\mathcal{O}_K^{(V)}$ refers to a node set of the virtual network which is not allocated to the substrate network.

After performing the VNM mapping, a resource situation of the substrate network is changed so that the resource situation is updated by the following equation and the substrate network graph embedding is calculated again.

$$x_{c,i}^{(s)} = x_{c,i-1}^{(s)} - x_c^{(v)}$$

In the optimized mapping mode, the network decoder may operate as follows.

In the normal mapping mode, all the possible node pairs for the virtual network and the substrate network are obtained and then a score for the pair is obtained. However, in the optimized mode, a node of the virtual network is selected by the two-step mapping, and a node of the substrate network is selected based on the selected virtual network so that more accurate virtual network mapping is performed.

First, a score is calculated for the virtual network nodes as follows by the MLP.

$$q^{(v)} = MLP\left(\left[e^{(v)}:g^{(s)}:\frac{X_C^{(S)}}{X_{C,\tau}^{(S)}}\right]\right) \text{ for } v \in O_k^{(V)}$$

Here, $X^{(S)}_C$ is a total resource of the substrate network, $X^{(S)}_{C,\tau}$ is an available resource of the substrate network, and $g^{(s)}$ is a graph embedding value in the entire network level, and are calculated as follows.

$$g^{(s)} = MLP\left(\left[\sum_{s \in O_k^{(S)}} e^{(s)}:\frac{|O_k^{(S)}|}{|O^{(S)}|}\right]\right)$$

Further, $\mathcal{O}^{(S)}$ is a node set of the substrate network, and $\mathcal{O}_K^{(S)}$ is a set of nodes which have never been mapped, among nodes of the substrate network.

The score for the virtual network node is ranked by a value through the following equation Softmax to select a node having a largest value.

$$Pr[v] = \frac{\exp(q^{(v)})}{\sum_{v' \in O_k^{(V)}} \exp(q^{(v)})}$$

When the node of the virtual network is selected, the score is calculated for the nodes of the substrate network by the following equation, based on the selected node.

$$q^{(s)} = MLP\left(\left[e^{(v)}:e^{(s)}:\frac{\bigoplus_{c \in C} x_c^{(s)}}{\bigoplus_{c \in C} x_{c,\tau}^{(s)}}\right]\right)$$

Here, ⊕ is a concatenation calculation.

Similar to the node selection of the virtual network, the ranking is obtained by the value through the following equation Softmax to select a node having the largest value to map the virtual network node and the substrate network node.

Similar to the normal mode, the process is repeated until the virtual network can be mapped to the substrate network. In the optimized mode, it is determined whether to perform the network graph embedding through the following equation EMModel function rather than newly performing the substrate network embedding (a principle is to perform graph embedding of the substrate network again because when the node of the virtual network is mapped to the node of the substrate network, an available resource situation for the substrate network is changed) after every node pair mapping.

$$dst = EMModel(E_{\tau_1}^{(S)}, X_{\tau_1}^{(S)}, X_{\tau_2}^{(S)})$$

$$= MLP\left(\left[\sum_{s \in O_{\tau_1}^{(S)}} e_{\tau_1}^{(s)} \cdot \frac{X_{C,\tau_2}^{(S)}}{X_{C,\tau_1}^{(S)}} \cdot \frac{|O_{\tau_2}^{(S)}|}{|O_{\tau_1}^{(S)}|}\right]\right)$$

The EMModel function predicts a difference for substrate network embedding $E_{\tau_1}^{(S)}$ and $E_{\tau_2}^{(S)}$ for different times $\tau 1$ and $\tau 2$ so that if a value derived by the above equation exceeds a threshold, the substrate network graph embedding is performed, and if not, the existing value is used as it is without performing the substrate network graph embedding.

EMModel may be trained by supervised learning by collecting $E_{\tau_1}^{(S)}$, $X_{\tau_1}^{(S)}$, $X_{\tau_2}^{(S)}$, $|E_{\tau_1}^{(S)}-E_{\tau_2}^{(S)}|$ samples, differently from the MLP functions of the encoder-decoder which are trained end to end by reinforcement learning.

FIGS. 3A to 3D are exemplary views of a performance to which a graph embedding-based virtual network mapping method according to the present invention is applied.

FIGS. 4A to 4D are exemplary views of a performance to which a graph embedding-based virtual network mapping method according to the present invention is applied.

Figure 5A:
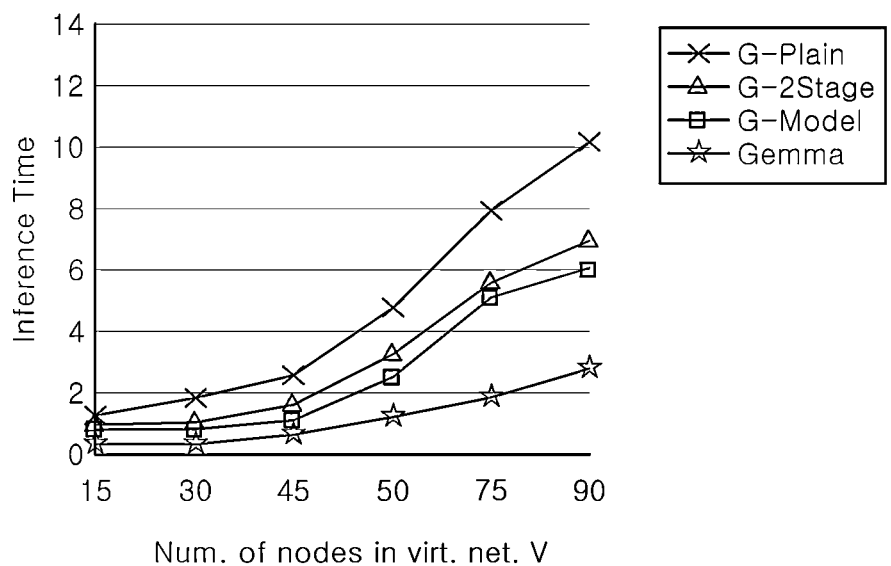
FIGS. 5A and 5B are exemplary views of a performance to which a graph embedding-based virtual network mapping method according to the present invention is applied.
Figure 5B:
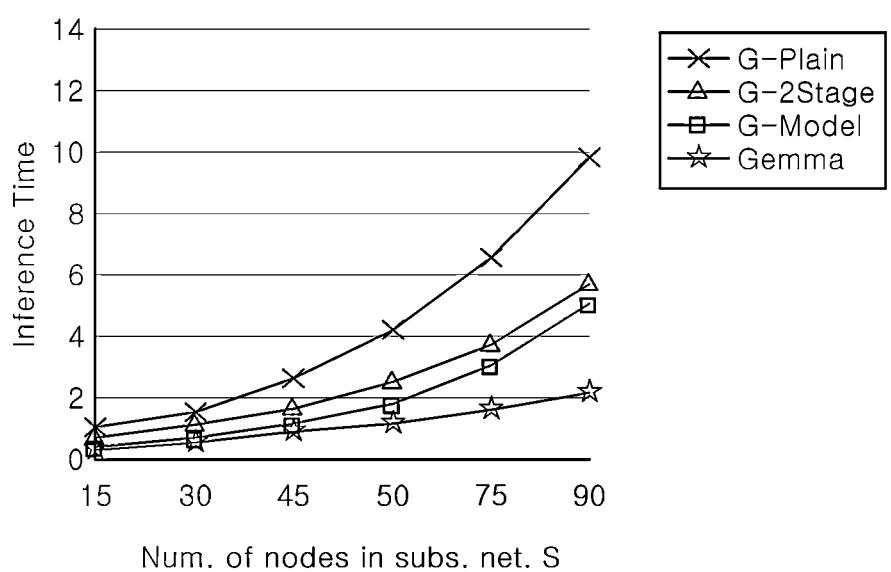

FIGS. 5A and 5B are exemplary views of a performance to which a graph embedding-based virtual network mapping method according to the present invention is applied.

In FIGS. 3A to 3D, as an executing example of the present invention (Gemma), a virtual network pharming scenario of a data center is assumed. Slowdown refers to an actual executing time including a placement time compared to an expected virtual network execution time, and the lower the slowdown, the better the performance.

In FIGS. 4A to 4D, as an executing example of the present invention (Gemma), an internet service provider VNM scenario is assumed. The acceptance ratio refers to a number of virtual networks allocated to the substrate network with respect to the entire virtual network, and the higher the acceptance ratio, the better the performance.

FIGS. 5A and 5B relate to the optimization of the present invention as an executing example of the present invention (Gemma). Gemma is an optimized algorithm and one or two is excluded from the Gemma algorithm to represent the trade-off of the optimization.

The features, structures, effects and the like described in the foregoing embodiments are included in at least one embodiment of the present invention and are not necessarily limited to one embodiment. Moreover, the features, structures, effects and the like illustrated in each embodiment may be combined or modified by those skilled in the art for the other embodiments to be carried out. Therefore, the combination and the modification of the present invention are interpreted to be included within the scope of the present invention.

It will be appreciated that various exemplary embodiments of the present invention have been described herein for purposes of illustration, and that various modifications, changes, and substitutions may be made by those skilled in the art without departing from the scope and spirit of the present invention. Therefore, the exemplary embodiments of the present invention are provided for illustrative purposes only but not intended to limit the technical concept of the present invention. The scope of the technical concept of the present invention is not limited thereto. The protective scope of the present invention should be construed based on the following claims, and all the technical concepts in the equivalent scope thereof should be construed as falling within the scope of the present invention.

The invention claimed is:

1. A graph embedding-based virtual network mapping method comprising:
   inputting a virtual network and a substrate network corresponding to a virtual network mapping scenario;
   in an optimized mapping mode, generating an embedding value for every substrate node by applying a graph convolution network (GCN) to embed the virtual network, by a network encoder;
   determining whether a difference value between the embedding value for every substrate node and an embedding value for every previous substrate node which is previously embedded exceeds a set threshold, by a network decoder; and
   mapping an allocation node of the virtual network to a mapping node of a previous substrate network which is previously mapped according to the embedding value for every previous substrate node in response to the difference value not exceeding the threshold value, by the network decoder.

2. The graph embedding-based virtual network mapping method according to claim 1, further comprising:
   controlling the network encoder to generate an embedding value for every node by embedding the substrate network by the network decoder when the difference value exceeds the threshold.

3. The graph embedding-based virtual network mapping method according to claim 2, wherein in the mapping, an allocation node of the virtual network and a mapping node of the substrate network are mapped to each other based on the embedding value for every substrate node and the embedding value for every node.

4. The graph embedding-based virtual network mapping method according to claim 3, wherein in the mapping, the allocation node having a highest embedding value is selected among the embedding values for every substrate node, and the allocation node and the mapping node are mapped.

5. The graph embedding-based virtual network mapping method according to claim 1, further comprising:
   generating the embedding value for every node by embedding the embedding value for every substrate node and the substrate network by the network encoder, in a normal mapping mode; and
   mapping an allocation node of the virtual network and a mapping node of the substrate network based on the embedding value for every substrate node and the embedding value for every node, by the network decoder.

6. The graph embedding-based virtual network mapping method according to claim 1, further comprising:
   determining whether a current mode is the optimized mapping mode before the generating of the embedding value.

7. The graph embedding-based virtual network mapping method according to claim 1, wherein in a generating of an embedding value, the embedding value for every substrate node and an embedding value for every node are generated by applying a distance between nodes of the virtual network and a distance between nodes of the substrate network to a multilayer perceptron (MLP) function.

* * * * *